April 28, 1959
H. R. GEIGER, JR
2,883,840
SILENT GEAR COUPLING FOR ELECTRIC MOTOR
Filed Feb. 23, 1956
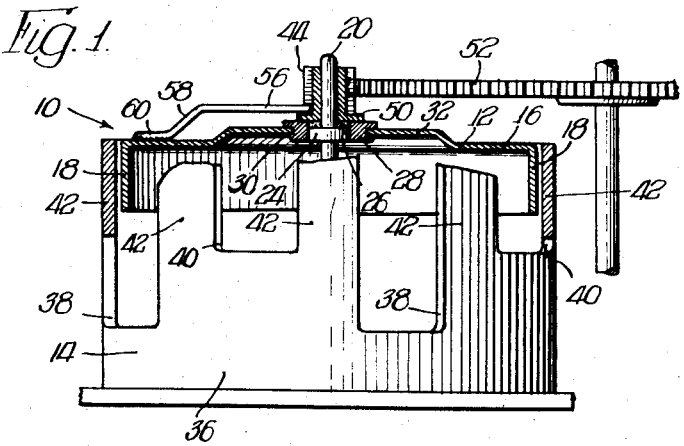
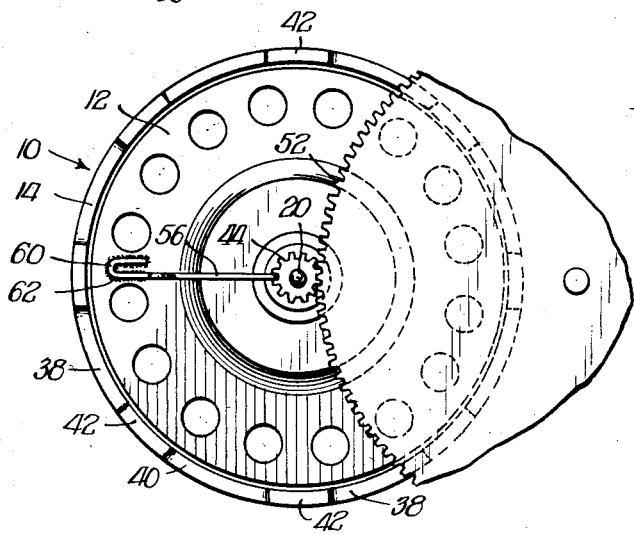
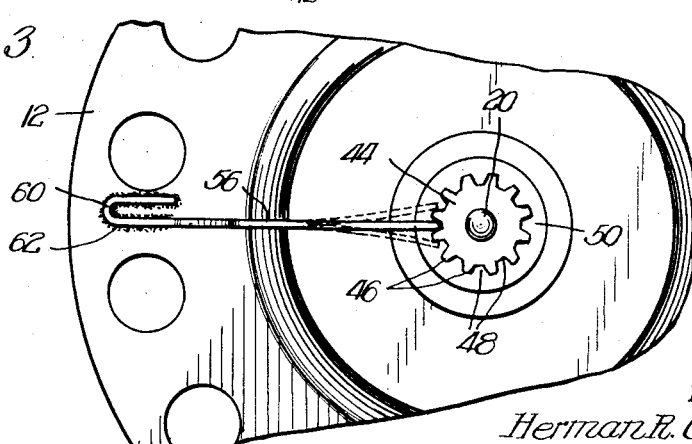
INVENTOR.
Herman R. Geiger, Jr.,
BY Brown, Jackson,
Boettcher + Dienner United States Patent Office 2,883,840
Patented Apr. 28, 1959

2,883,840

SILENT GEAR COUPLING FOR ELECTRIC MOTOR

Herman R. Geiger, Jr., Rochester, Ill., assignor to Sangamo Electric Company, Springfield, Ill., a corporation of Illinois Application February 23, 1956, Serial No. 567,264

6 Claims. (Cl. 64—27)

The present invention relates generally to an improved silent gear coupling for electric motors, and more particularly to such a coupling for alternating current synchronous motors.

In the very extensive use of small synchronous motors for driving timing devices, there are numerous situations in which even a very slight amount of operating noise is highly objectionable. This is particularly true of electric clocks, radio time switches and other electrically operated time switches for use in the home, in bedrooms, living rooms etc.

One of the main sources of objectionable noise in these synchronous motor driven devices arises at the first gear reduction in the gear train, that is to say between the pinion which is mounted on the synchronous motor shaft and the gear wheel which this pinion drives. The use of fine pitch gears at this point tends to keep the noise level down. However, there is a definite limit as to how far this can be carried, due to the increasing accuracy requirements with finer teeth. Another noise reducing expedient is to enclose the gears in a gear box, which helps to some extent, but the gear box nevertheless functions as a noise transmitter. The introduction of oil or grease into such gear box also has its limitations and objections, due to the difficulty of retaining the lubricants where desired, and the fact that lubricants in general have a tendency to deteriorate with age and heat. Also, many lubricants are unsuitable for this general purpose, owing to the wide range of temperatures under which these devices are frequently called upon to operate.

Another noise reducing expedient is to construct the large gear and the pinion gear of different materials, such as by constructing one of these gears of a linen or paper base phenolic composition, or of plastic or rubber composition, and constructing the other gear of metal. When certain combinations of such materials are used with gears of relatively fine pitch and with dimensions held to close tolerances, it is possible to materially reduce the noise level. However, this requires careful control of the depth of mesh between the gear teeth, and a high degree of concentricity or bearing accuracy of the large gear wheel and pinion. The accurate control of these several factors is difficult, and in production line practice it is often nearly impossible to accomplish.

The general object of the present invention is to avoid these prior objections by providing an improved resilient or flexible type of coupling between the rotor of the synchronous motor and the concentrically mounted pinion driven thereby. It appears that a substantial part of the noise is not due to the making of contact between the gear teeth simply due to rotation, but instead is due to the fact that the driving torque of an alternating current synchronous motor is of an intermittent nature which results in a non-uniform angular motion of the driving pinion. It has been found in the practice of my invention that by coupling the pinion to the synchronous rotor by a sufficiently flexible coupling of the general type herein disclosed, the objectionable noise can be practically eliminated, or at least brought down to an acceptable level.

Other objects, features and advantages of the invention will appear from the following detail description of one preferred embodiment thereof. In the accompanying drawing illustrating such embodiment:

Figure 1 is an axial sectional view through the rotor of a synchronous motor and through its driving pinion, showing the flexible coupling which serves to transmit torque from the rotor to the gear;

Figure 2 is an end elevational plan view of the rotor pinion and flexible coupling; and Figure 3 is a fragmentary elevational or plan view showing the coupling on a larger scale.

Figures 1 and 2 illustrate fragmentarily a small self-starting, alternating current synchronous motor 10 of any conventional or preferred design suitable for driving an electric clock, an electric time switch, or any other device adapted to be driven by such a motor. The motor comprises a rotor 12 arranged to revolve under the influence of magnetic fields created by a stator structure 14. The rotor is shown as being of cup-shaped formation comprising a web portion 16 and a downwardly or laterally extending peripheral flange 18, but the rotor might be disk-shaped, drum-shaped or of any other suitable formation. The rotor is secured fast to a shaft 20 which extends down into the stator structure 14 and has bearing support at spaced points therein. The rotor 12 may be secured to the shaft 20 in any manner, but as illustrative of one preferred method of attaching the rotor to the shaft I have shown the shaft as being provided with a collar 24 which is soldered at 26 in a bushing 28 that is staked or spun in a central opening 30 formed in a raised central portion 32 of the web 16. In the exemplary embodiment shown, the stator 14 comprises a cylindrical shell 36 having peripheral slots 38 and 40 of different depths extending down from one end of the shell and defining pole teeth 42 which closely encircle the rotor flange 18; but it will be understood that this is merely exemplary and that the stator may assume other constructions.

Mounted on the projecting upper end of the shaft 20, above the rotor 12, is a spur pinion 44 comprising gear teeth 46 separated by tooth spaces 48. Formed integrally with the lower end of this pinion is a radially projecting circular flange 50, which extends outwardly beyond the gear teeth 46. This pinion 44 is free to rotate with respect to the shaft 20 and to slide axially thereof. The pinion 44 meshes with a large gear 52 constituting part of the gear train leading to the clock hands, or to the switch cam or other time driven part. I preferably make the pinion 44 from molded nylon, but it may be composed of other plastics or other materials. The large gear wheel 52 may be composed of phenolic material or it may be constructed of metal. The matching teeth of the pinion and gear wheel are preferably relatively fine.

As will be seen from Figure 1, the gear wheel 52 meshes with the upper or outer portion of the pinion 44, so as to leave space for the flexible coupling to rotate in a plane below or on the inner side of the gear wheel 52, as I shall now describe.

My improved flexible coupling comprises a length of spring wire 56 which has its outer end anchored to the rotor 12 and which has its inner end extending radially inwardly into the tooth spaces 48 between the gear teeth 46 of the pinion 44. The outer portion of the spring wire 56 is bent to slope diagonally downwardly and outwardly at 58, and is then bent horizontally into a flat U-shaped end 60. This U-shaped end 60 is soldered at 62 to the upper side of the rotor web 16. The inner end of the spring wire extends on a radial line into the nearest tooth space 48 but does not bottom against the pinion in this tooth space. This inner end of the spring wire lies in a plane between the under side of the large gear wheel 52 and the upper side of the confining flange 50 on pinion 44, in which position the spring wire confines the spur pinion 44 against axial displacement off the end of the shaft. The entire length of the spring wire 56 from the U-shaped attaching end 60 to the inner extremity of the wire is free to flex laterally into the dotted line positions shown in Figure 3, as torque variations occur between the rotor 12 and the pinion 44. The spring wire transmits all torque from the rotor 12 to the pinion 44, but by reason of the lateral flexibility of the spring wire the drive to the pinion has a resilient or yielding characteristic. The spring wire 56 is preferably composed of beryllium copper and is heat treated for maximum spring properties. This spring wire is so proportioned and heat treated that it has sufficient stiffness to enable the coupling to transmit the full torque of the rotor, but is sufficiently flexible to allow the pinion 44 to be turned forcibly with relation to the rotor 12 without damaging either the spring wire 56 or the pinion 44. For example, where the maximum torque of the motor is approximately .06 oz.-in., the effective length of the spring wire is .54 inch the pinion 44 has 12 teeth of .041 circular pitch and the spring wire 56 is made from beryllium copper wire having a modulus of elasticity of 17 million pounds per square inch, we find that a diameter of .020 inch results in sufficient stiffness to enable the coupling to transmit the full torque of the motor and also is quiet in operation.

The pinion 44 and spring wire 56 can function as a friction slippage clutch to prevent damage to the coupling in case the driven wheel 52 is suddenly stopped due to excessive load, or if excessive torque should unintentionally be applied through rough handling. The relatively long free flexing span of spring wire 56 intervening between the point of anchorage of its outer end 60 to the rotor and the engagement of its driving inner end in the tooth spaces 48 of the pinion, affords a relatively wide range of resilient angular movement between the rotor 12 and pinion 43 during the normal functioning of the apparatus as a flexible or resilient coupling. Similarly, when the apparatus functions in its infrequent or abnormal capacity of a slippage clutch, this long free flexing span of the spring wire 56 enables the inner driving end of the wire to snap from tooth space to tooth space of the pinion 44 without causing injury to the spring wire 56 or pinion 44. This permits the coupling to be sufficiently resilient and yet at the same time rugged enough to stand ordinary handling. The spring wire 56 may be pushed beyond the edge of flange 50 to allow assembly or removal of the pinion without the use of tools.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a silent gear coupling for synchronous electric motors, the combination of a synchronous electric motor comprising a rotor, a shaft for said rotor, a pinion mounted for free rotative and sliding movement on said shaft, said pinion comprising a circularly arranged series of pockets and a projecting confining flange adjacent to one end, and a spring wire having its outer end secured to said rotor and having its inner end engaging in said pockets on the outer side of said confining flange, whereby to establish a flexible coupling between said rotor and said pinion and whereby to confine said pinion in its axial shifting movement on said shaft.

2. In a silent gear coupling for synchronous electric motors, the combination of a synchronous electric motor comprising a rotor, a shaft for said rotor, a pinion mounted for free rotation on said shaft, and a spring wire of circular cross section establishing a flexible coupling between said rotor and said pinion, the outer end of said spring wire being formed with a U-shaped attaching portion soldered to said rotor, the inner end of said spring wire extending into one of the tooth spaces between the teeth of said pinion.

3. In a silent gear coupling for synchronous electric motor drives, the combination of a synchronous electric motor comprising a rotor, a pinion mounted coaxially of said rotor and operative to rotate relatively thereto, said pinion also being capable of axial sliding movement relatively to said rotor, said pinion comprising a projecting confining flange adjacent to one end, and a spring wire operatively connecting said rotor with said pinion, the outer end of said spring wire being formed with a U-shaped attaching portion soldered to said rotor, the inner end of said spring wire extending into one of the tooth spaces between the teeth of said pinion and overlying said confining flange, whereby to establish a flexible coupling between said rotor and said pinion and whereby to substantially hold said pinion against axial shifting movement relatively to said rotor.

4. In a silent gear coupling for synchronous electric motors, the combination of a synchronous electric motor comprising a rotor, a shaft for said rotor, a pinion mounted for free rotative and sliding movement on said shaft, said pinion being composed of molded nylon, and a single spring wire having one end secured to said rotor and having its other end engaging in one of the tooth spaces of said pinion for establishing a flexible coupling and a slippage clutch between said rotor and said pinion, said single spring wire constituting the sole driving connection between said rotor and said pinion.

5. In apparatus functioning in the two-fold capacity of a flexible coupling and a slippage clutch for electric motors, the combination of an electric motor comprising a rotor, a gear pinion mounted coaxially of said rotor so as to be capable of free rotation relatively thereto, said pinion comprising a series of gear teeth having tooth spaces therebetween and adapted to be driven by said rotor, and a spring wire having its outer end anchored to said rotor and having its inner end engaging in one of the tooth spaces of said pinion, said spring wire having a relatively long free flexing span between its anchored outer end and its driving inner end whereby to permit a wide range of spring resisted relative rotation between said driving rotor and said driven pinion in the normal functioning of the apparatus as a flexible coupling, and whereby to permit the driving inner end of said spring wire to snap from tooth space to tooth space of said pinion in the abnormal functioning of the apparatus as a slippage clutch.

6. In apparatus adapted to normally function as a flexible coupling for an electric motor but being also capable of abnormally functioning as a slippage clutch therefor, the combination of a synchronous electric motor comprising a rotor, a shaft for said rotor, a pinion mounted for free rotation on said shaft, said pinion being adapted to be driven by said rotor and comprising a series of gear teeth having tooth spaces therebetween, and means coupling said rotor with said pinion comprising a single spring wire having its inner end engaging in one of the tooth spaces of said pinion but out of contact with the bottom of such tooth space, and anchoring means anchoring the outer end of said spring wire to said rotor, said anchoring means being spaced radially outwardly a substantial distance from the inner end of said spring wire to provide a relatively long free flexing span of spring wire between its anchored outer end and its driving inner end, whereby to permit a wide range of spring resisted relative rotation between said driving rotor and said driven pinion in the normal functioning of the apparatus as a flexible coupling, and whereby to permit the driving inner end of said spring wire to snap from tooth space to tooth space of said pinion without causing injury to said spring wire or pinion in the abnormal functioning of the apparatus as a slippage clutch.

References Cited in the file of this patent

UNITED STATES PATENTS

| | | |
|---|---|---|
| 1,756,689 | Jenkins | Apr. 29, 1930 |
| 1,864,108 | Whitehead | June 21, 1932 |
| 1,939,226 | Raven | Dec. 12, 1933 |
| 2,003,116 | Hammond | May 28, 1935 |
| 2,682,779 | Stein | July 6, 1954 |

FOREIGN PATENTS

| | | |
|---|---|---|
| 623,303 | Germany | Nov. 28, 1935 |